US008752135B2

(12) United States Patent
Nehowig et al.

(10) Patent No.: US 8,752,135 B2
(45) Date of Patent: Jun. 10, 2014

(54) NOTIFICATIONS IN A CREDENTIAL PRODUCTION SYSTEM

(75) Inventors: Kelly R. Nehowig, Maple Grove, MN (US); David T. Gale, Champlin, MN (US); Lisa A. Fischer, Plymouth, MN (US); Keith A. Platfoot, Eden Prairie, MN (US); John E. Ekers, Plymouth, MN (US); Thomas A. Zappe, Fridley, MN (US)

(73) Assignee: Assa Abley AB, Stokholm (SE)

( * ) Notice: Subject to any disclaimer, the term of this patent is extended or adjusted under 35 U.S.C. 154(b) by 1389 days.

(21) Appl. No.: 11/465,521

(22) Filed: Aug. 18, 2006

(65) Prior Publication Data
US 2007/0043764 A1 Feb. 22, 2007

Related U.S. Application Data

(60) Provisional application No. 60/709,401, filed on Aug. 18, 2005, provisional application No. 60/715,945, filed on Sep. 9, 2005.

(51) Int. Cl.
*H04L 29/00* (2006.01)
(52) U.S. Cl.
USPC ............... 726/4; 726/1; 726/2; 726/3; 726/26
(58) Field of Classification Search
USPC ............................................. 726/1–4, 26–33
See application file for complete search history.

(56) References Cited

U.S. PATENT DOCUMENTS

| | | | |
|---|---|---|---|
| 6,592,035 B2* | 7/2003 | Mandile | 235/454 |
| 7,131,585 B2 | 11/2006 | Gyi et al. | |
| 7,216,086 B1* | 5/2007 | Grosvenor et al. | 705/7 |
| 7,430,762 B2* | 9/2008 | Klinefelter et al. | 726/30 |
| 7,434,728 B2* | 10/2008 | Paulson et al. | 235/380 |
| 7,490,055 B2* | 2/2009 | Holland et al. | 705/26 |
| 7,707,625 B2* | 4/2010 | Klinefelter | 726/6 |
| 2004/0050936 A1* | 3/2004 | Look et al. | 235/462.1 |
| 2005/0082364 A1* | 4/2005 | Alvarez et al. | 235/381 |

OTHER PUBLICATIONS

U.S. Appl. No. 60/666,523, Klinefelter et al., "Printer System Having a Process Diagnostics System for Detecting Events and an Event Manager" and "Printer with a Process Diagnostics System for Detecting Events", filed Mar. 30, 2005.*

* cited by examiner

*Primary Examiner* — Jeffrey Pwu
*Assistant Examiner* — Helai Salehi
(74) *Attorney, Agent, or Firm* — Westman, Champlin & Koehler, P.A.; Brian D. Kaul

(57) ABSTRACT

A credential production system includes a credential production device and a computing device in communication with the credential production device. The computing device receives a credential production event from the credential production device. The computing device applies a pre-defined set of rules to the credential production event to determine if the credential production event violates any of the pre-defined set of rules. The computing device performs an action if the credential production event violates at least one of the pre-defined set of rules.

25 Claims, 2 Drawing Sheets

NOTIFICATIONS IN A CREDENTIAL PRODUCTION SYSTEM

The present application claims the benefit of U.S. provisional patent application Ser. No. 60/709,401 fled Aug. 18, 2005 and 60/715,945, filed Sep. 9, 2005, all of which are hereby incorporated by reference in their entirety.

FIELD OF THE INVENTION

The present invention is generally directed to a credential production system. More particularly, the present invention is directed to methods and components for handling notifications in a credential production system.

BACKGROUND OF THE INVENTION

Credentials include identification cards, driver's licenses, passports, and other valuable documents. Such credentials are formed from credential substrates including paper substrates, plastic substrates, cards and other materials. Such credentials generally include printed information, such as a photo, account numbers, identification numbers, and other personal information that is printed on the credential substrates using a print consumable, such as ink and ribbon. A secure overlaminate or security label may also be laminated to the surfaces of the credential substrate to protect the printed surfaces from damage or provide a security feature (e.g., hologram). Additionally, credentials can include data that is encoded in a smartcard chip, a magnetic stripe, or a barcode, for example.

Credential manufacturing systems or credential production systems generally include at least one credential processing device that processes a credential substrate to perform at least one step in forming the final credential product. Such credential processing devices include, for example, printing devices for printing images to the credential substrate, laminating devices for laminating an overlaminate to the credential substrate, devices for attaching labels, and encoding devices for encoding data to the substrate. Credential production devices process a credential substrate in response to a credential processing job generated by a credential producing application. The credential processing job generally defines the printing, laminating, attaching and/or encoding processes that are to be performed by the credential manufacturing device on the credential substrate.

Preventing the unauthorized use of credential manufacturing systems to produce unauthorized credentials is important in the processing of credential substrates. One such way of preventing the unauthorized use of credential manufacturing systems is to require the use of customized consumable supplies having limited use with only specifically authorized credential production devices, such as disclosed in U.S. Patent Publication No. 2003/0216826 assigned to Fargo Electronics, Inc. of Eden Prairie, Minn. Such a limitation on the use of the customized supplies can prevent a counterfeiter from seizing the supplies and using them with an unauthorized credential production device to produce counterfeit credentials.

While such customized supplies can provide a sound defense to counterfeiting by those who do not have access to the credential manufacturing system that is authorized for use with the stolen customized credentials, the customized supplies cannot prevent unauthorized credential production from those that have access to the authorized credential manufacturing system. Thus, for example, an employee of a company who has access to both the customized supplies and the corresponding authorized credential manufacturing system could potentially make an unauthorized credential.

Embodiments of the present invention provide solutions to these and other problems, and offer other advantages over the prior art.

SUMMARY OF THE INVENTION

The disclosure includes a credential production system having a credential production device and a computing device in communication with the credential production device. The computing device receives a credential production event from the credential production device. The computing device applies a pre-defined set of rules to the credential production event to determine if the credential production event violates any of the pre-defined set of rules. The computing device performs an action if the credential production event violates at least one of the pre-defined set of rules.

The disclosure also includes a method of handling credential production events in a credential production system. A credential production event is received from a credential production device. A pre-defined set of rules is applied to the credential production event to determine if the credential production event violates any of the pre-defined set of rules. An action is performed if the credential production event violates at least one of the pre-defined set of rules.

DETAILED DESCRIPTION OF THE PREFERRED EMBODIMENTS

Embodiments of the disclosure include the handling of credential production events in a credential production system. In a credential production system, credential substrates are processed by a credential production device using consumable materials. Such valuable documents include, for example, credentials, such as identification badges, loyalty cards, financial bank cards, phone cards, healthcare cards, passports, birth certificates or other printed documents where secure issuance is desired. Credential production events include actions performed by the credential production device.

Figure 1:
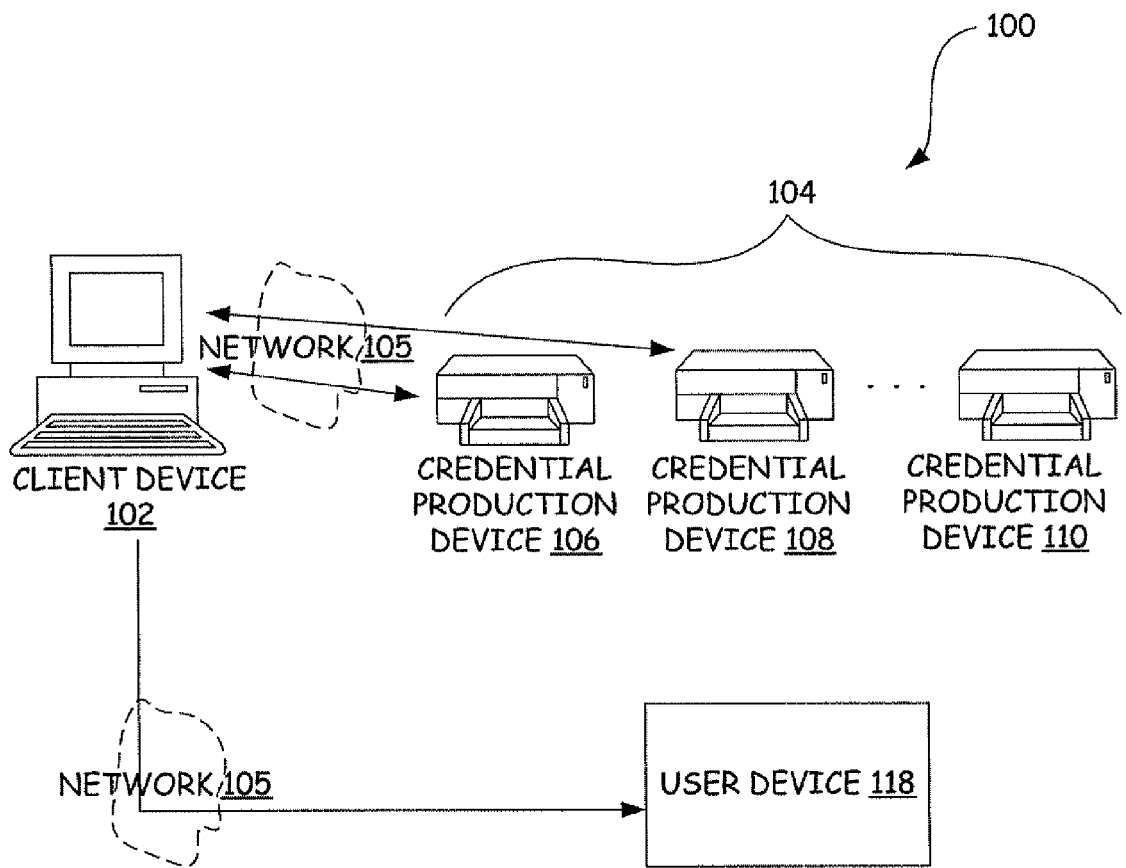
FIG. 1 is a schematic diagram of an exemplary credential production system.

FIG. 1 illustrates a simplified schematic diagram of a credential production system 100 in accordance with an embodiment. Credential production system 100 includes a computing device 102 and a plurality of credential production devices 104. Although FIG. 1 illustrates only a single computing device 102, it should be noted that credential production system 100 can include any number of computing devices that can communicate with any number of credential production devices. An example computing device is a personal computer, host server or other type of processor that instructs at least one of the plurality of credential production devices 104 to process a credential substrate.

Computing device 102 is coupled to and communicates with at least one of the plurality of credential production devices 104 over a network 105. Computing device 102 is also coupled to and communicates with at least one user device 112 over network 105. In one embodiment, network 105 can be an internet or intranet. In such an embodiment, computing device 102 can be remotely located from credential production devices 104 and user device 112. In addition, network 105 can be a local area network (LAN) or a wide area network (WAN). Such networking environments are commonly used in offices, enterprise-wide networks, on intranets and the internet. In another embodiment, computing device 102 can communicate with the plurality of credential production devices 104 and user device 112 directly using conventional methods such as including a physical communication link (i.e., cable connection such as, for example, a Universal Serial Bus) or a wireless communication link (such as, for example infrared or radio frequency).

Also in FIG. 1, the plurality of credential production devices 104 include first credential production device 106, second credential production device 108 and third credential production device 110. As illustrated by the plurality of dots, credential production system 100 can include any number of credential production devices. Credential production devices are configured to process a credential substrate (e.g., card substrates, paper substrates, plastic substrates, substrates used to form passports and other valuable substrate documents) by using at least one consumable supply to perform at least one step in forming a credential (e.g., identification card, passport, employee badge and etc.). Exemplary credential production devices include printing devices (e.g., printer and etc) for printing images to a credential substrate, laminating devices for laminating overlaminate to a credential substrate and encoding devices for encoding data (e.g., writing a barcode, recording data to a magnetic stripe, writing data in a memory chip and etc.) to the credential substrate.

In credential production system 100, computing device 102 sends instructions to one of the credential production devices 104 for processing a credential substrate. For example, if one of the credential production devices 104 is a printer, computing device 102 is configured to transmit a print job to that credential production device. Credential production devices 104 receive instructions from computing device 102 and in response process credential substrates.

Besides processing a credential substrate in response to receiving a processing job from computing device 102, credential production devices 104 are also configured to communicate credential production events to computing device 102. Credential production events include actions and verifications performed by the credential production device before a credential production job is processed, during the processing of a credential production job and after a credential production job is processed. Exemplary credential production events that can take place prior to processing of a credential production job include credential production device malfunction, a determination that the credential production device lacks consumable supplies, a consumable supply has not been inserted into the credential production device in an appropriate amount of time after enablement of the consumable supply, time, date, source of initiation and type of a credential production job and other important pre-production conditions. Exemplary credential production events that can take place during the processing of a credential production job include credential production device malfunction, credential production interruption and other important in process conditions. Exemplary credential production events that can take place after the processing of a credential production job include time and date of completion of a credential production job, time and date of retrieval by an operator of the processed credential and other important post-production conditions.

Figure 2:
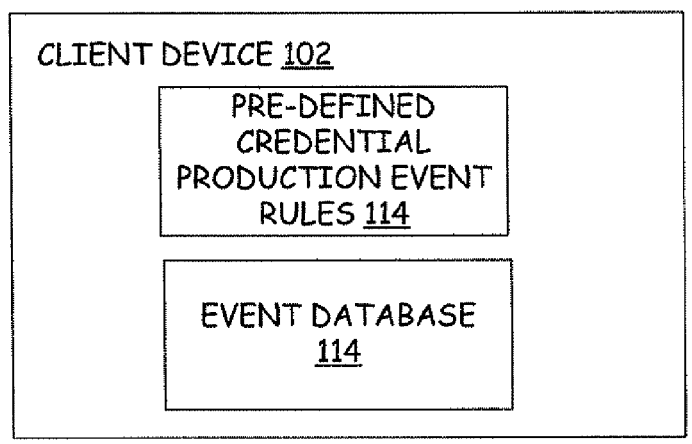
FIG. 2 illustrates a computing device.

FIG. 2 illustrates a simplified block diagram of computing device 102. Computing device 102 includes an event database 114 and a set of pre-defined credential production event rules 116. Upon computing device 102 receiving a credential production event from one of the plurality of credential production devices 104, computing device 102 applies the set of pre-defined credential production event rules 116 against the received credential production event. By applying the set of pre-defined credential production event rules 116, computing device 102 can determine if an action needs to be taken based on the received production event and whether or not the production event should be logged into event database 114.

Figure 3:
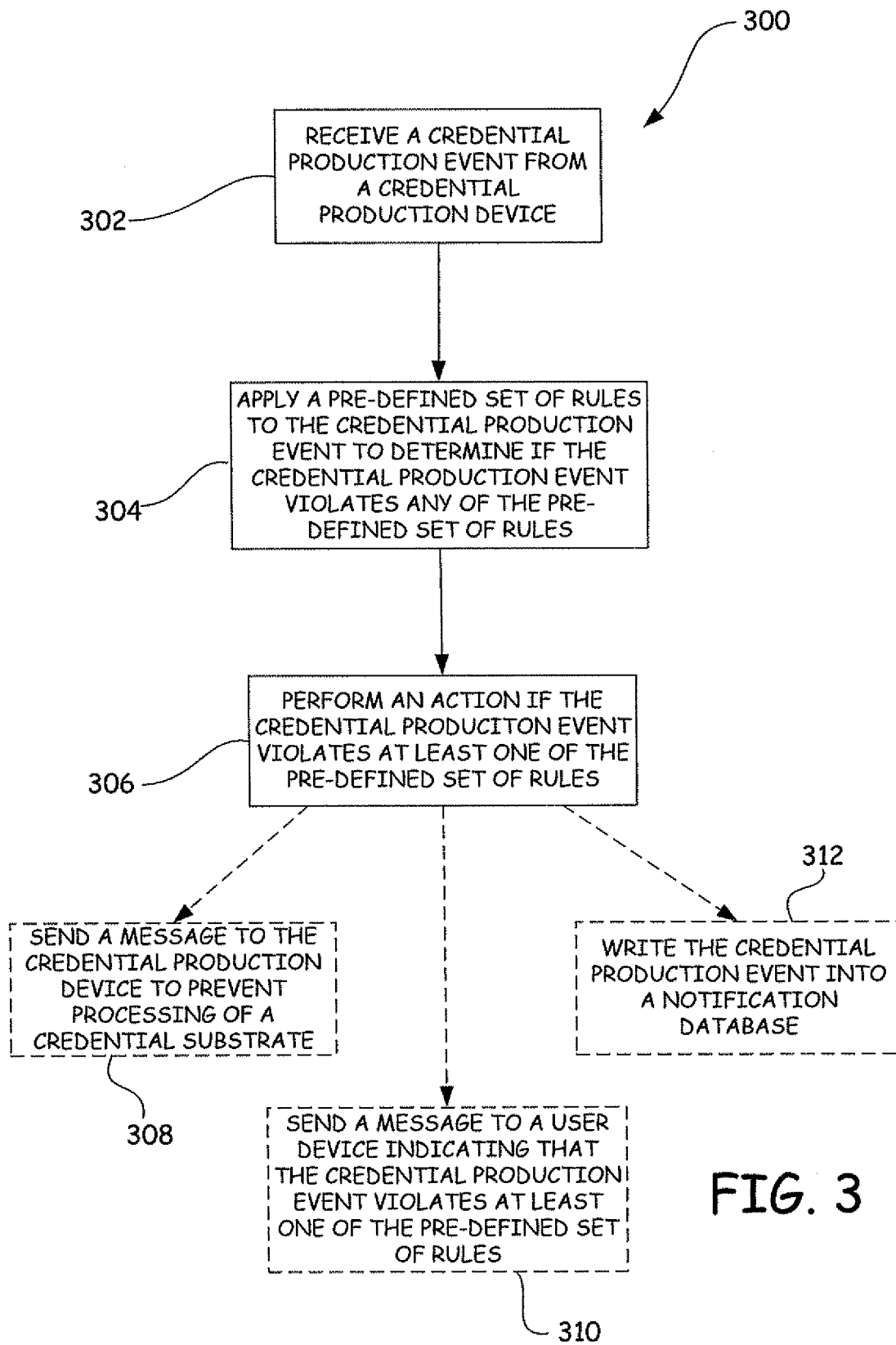
FIG. 3 is a flowchart illustrating a method of handling credential production events in a credential production system.

FIG. 3 is a flowchart 300 illustrating a method of handling credential production events in a credential production system. At block 302, a computing device, such as computing device 102 is configured to receive a credential production event from a credential production device, such as credential production device 108. The credential production event received from the credential production device is in the form of a digital message. As previously discussed, the production event can be received from credential production device 108 by computing device 102 before processing of a credential substrate, during the processing of a credential substrate and after the processing of a credential substrate. After receiving the credential production event, computing device 102 is configured to apply a pre-defined set of rules, such as pre-defined credential production event rules 116, to the received credential production event to determine if the credential production event violates any of the pre-defined rules.

Exemplary pre-defined credential production event rules 116 include no credential production after hours, notify support of printer problems and no action need be taken when Engineers use credential production devices. These list of pre-defined credential production event rules 116 are exemplary. Computing device 102 can include other types of rules not specifically described. Each rule in the pre-defined credential production event rules 116 includes rule descriptions. Not only does the rule description describe elements of the rule, the rule description also includes what action computing device 102 should take in response to the production event. Referring to the exemplary pre-defined credential production rules 116, it should be noted that while the first rule can be violated, the second rule can be an exception to the first rule. Therefore, it is pertinent to note that computing device 102 needs to apply all pre-defined rules to each received credential production event to determine whether a pre-defined rule has been violated and that the violation is not exempted by any rules that are exceptions.

At block 306, after computing device 102 applies the credential production event to pre-defined credential production event rules 116, computing device 102 performs an action in response to credential production event if the credential production event violates at least one of the pre-defined credential production rules 116. It should be noted that computing device 102 performs an action if the credential production event violates at least on of the set of pre-defined rules and there is no exception to the pre-defined rule that was violated.

For example, for the rule no credential production after hours, the description includes "If any credential production device starts a production job outside of 8:00 am to 5:00 pm Monday through Friday (and on holidays), log the event in the database and notify a support personnel." In this example, if computing device 102 receives a production event that violates the no credential production after hours rule, then computing device 102 follows the rule description. Computing device 102 logs the production event into event database 114 and sends a notification message to user device 112 to notify a support personnel that a production job is starting to be performed that violates the no credential production after hours rule. In another example, the rule no credential production after hours can include a description "If any credential production device starts a production job outside of 8:00 am to 5:00 pm Monday through Friday (and on holidays), log the event in the database, notify a support personnel and stop processing of the production job." In this example, if computing device 102 receives a production event that violates the no credential production after hours rule, then computing device 102 follows the rule description. Computing device 102 logs the production event into event database 114, sends a notification message to user device 112 to notify a support personnel that a production job is starting to be performed that violates the no credential production after hours rule and sends a message to the credential production device that it received the credential production event to stop or prevent processing of the production job.

Blocks 308, 310 and 312 all illustrate the different types of actions that computing device 102 may perform in accordance with various pre-defined rules. It should be noted that these actions may all need to be performed in response to a single credential production event or only a select amount of these actions need to performed in response to a single credential production event. At block 308, computing device 102 may send a message to the credential production device that sent the credential production event to prevent the processing of a credential substrate. At block 310, computing device 102 may send a message to a user device, such as user device 112, indicating that the credential production event violates at least one of the set of pre-defined rules. User device 112 can be an administrator device, such as a personal computer, a laptop, or various other electronic devices such as a cell phone, a pager, a personal data assistant and etc. The message sent to the administrator device can be in the form of an email, text message, voice message or other type of message that an administrator can be alerted to immediately. At block 312, computing device 102 may write the credential production event to notification device 114 included in computing device 102. Logging notification database with the credential production event can be used for purposes of performing future auditing.

Although the present invention has been described with reference to preferred embodiments, workers skilled in the art will recognize that changes may be made in form and detail without departing from the spirit and scope of the invention.

What is claimed is:

1. A credential production system comprising:
   a credential production device that processes credential substrates in accordance with a credential production job and is selected from a group comprising a printing device, a laminating device and an encoding device, wherein the encoding device is configured to record data to a magnetic stripe or write data in a memory chip of the credential substrates;
   a computing device in communication with the credential production device to send the credential production device the credential production job, the computing device having a pre-defined set of rules and is configured to:
   receive a credential production event from the credential production device, the credential production event comprising a condition of the credential production device occurring one of before the credential production job is processed, during the processing of the credential production job and after the credential production job is processed;
   apply the pre-defined set of rules to the credential production event to determine if the credential production event violates any of the pre-defined set of rules; and
   perform an action if the credential production event violates at least one of the pre-defined set of rules.

2. The credential production system of claim 1, wherein the credential production event comprises an initiation of a processing of one of the credential substrates.

3. The credential production system of claim 1, wherein the credential production event comprises a malfunction with the credential production device.

4. The credential production system of claim 1, wherein the action performed by the computing device comprises sending a message to the credential production device to prevent processing of one of the credential substrates.

5. The credential production system of claim 1, wherein the action performed by the computing device comprises sending a message to a user device indicating that the credential production event violates at least one of the pre-defined set of rules.

6. The credential production system of claim 1, wherein the action performed by the computing device comprises writing the credential production event into a notification database.

7. The credential production system of claim 1, wherein the action performed by the computing device comprises:
   sending a first message to a user device indicating that the credential production event violates at least one of the pre-defined set of rules;
   sending a second message to the credential production device to prevent processing of a credential substrate; and
   writing the credential production event into a notification database.

8. The credential production system of claim 1, wherein the computing device comprises a notification database that is configured to contain logged credential production events.

9. The credential production system of claim 1, wherein the pre-defined set of rules applied by the computing device are based on a date of the credential production event, a time of the credential production event and a type of credential production device that generated the event.

10. The credential production system of claim 1, wherein performing an action if the credential production event violates at least one of the pre-defined set of rules comprises performing an action if the credential production event violates at least one of the pre-defined rules and the at least one pre-defined rule has no exceptions.

11. The credential production system of claim 1, wherein the credential production event comprises an indication that the credential production device lacks at least one consumable supply needed to process the at least one credential substrate.

12. The credential production system of claim 1, wherein the credential production device comprises the printing device.

13. The credential production system of claim 1, wherein the credential production device comprises the laminating device.

14. The credential production system of claim 4, wherein the credential production event comprises a condition of the credential production device occurring before the credential production job is processed.

15. The credential production system of claim 5, wherein the user device comprises an administrator device.

16. A method of handling credential production events in a credential production system, the method comprising:

receiving a credential production event from a credential production device that processes credential substrates in accordance with a credential production job and is selected from a group comprising a printing device, a laminating device and an encoding device, wherein the encoding device is configured to record data to a magnetic stripe or write data in a memory chip of the credential substrates;

applying a pre-defined set of rules to the credential production event to determine if the credential production event violates any of the pre-defined set of rules, the credential production event comprising a condition of the credential production device occurring one of before the credential production job is processed, during the processing of the credential production job or after the credential production job is processed; and performing an action if the credential production event violates at least one of the pre-defined set of rules.

17. The method of claim 16, wherein receiving the credential production event comprises receiving the credential production event indicating an initiation of a processing of at least one of the credential substrates.

18. The method of claim 16, wherein receiving the credential production event comprises receiving the credential production event indicating a malfunction with the credential production device.

19. The method of claim 16, wherein performing the action if the credential production event violates at least one of the pre-defined set of rules comprises sending a message to the credential production device to prevent processing of at least one of the credential substrates.

20. The method of claim 16, wherein performing the action if the credential production event violates at least one of the pre-defined set of rules comprises sending a message to a user device indicating that the credential production event violates at least one of the pre-defined set of rules.

21. The method of claim 16, wherein performing the action if the credential production event violates at least one of the pre-defined set of rules comprises writing the credential production event into a notification database.

22. The method of claim 16, wherein performing the action if the credential production event violates at least one of the pre-defined set of rules comprises:

sending a first message to a user device indicating that the credential production event violates at least one of the pre-defined set of rules;

sending a second message to the credential production device to prevent processing of a credential substrate; and writing the credential production event into a notification database.

23. The method of claim 16, wherein the pre-defined set of rules applied by the computing device are based on a date of the credential production event, a time of the credential production event and a type of credential production device that generated the event.

24. The method of claim 19, wherein the credential production event comprises a condition of the credential production device occurring before the credential production job is processed.

25. A credential production system comprising:

a credential production device that processes credential substrates in accordance with a credential production job and is selected from a group comprising a printing device, a laminating device and an encoding device;

a computing device in communication with the credential production device to send the credential production device the credential production job, the computing device having a pre-defined set of rules and is configured to:

receive a credential production event from the credential production device, the credential production event comprising a condition of the credential production device occurring one of before the credential production job is processed, during the processing of the credential production job or after the credential production job is processed;

apply the pre-defined set of rules to the credential production event to determine if the credential production event violates any of the pre-defined set of rules;

perform a plurality of actions if the credential production event violates at least one of the pre-defined set of rules;

a user device in communication with the computing device over a network; and wherein one of the actions performed if the credential production event violates at least one of the pre-defined set of rules comprises sending a message to the user device indicating that the credential production event violates at least one of the pre-defined set of rules.

* * * * *